US007580963B2

United States Patent
Kawano et al.

(10) Patent No.: US 7,580,963 B2
(45) Date of Patent: Aug. 25, 2009

(54) SEMICONDUCTOR DEVICE HAVING AN ARITHMETIC UNIT OF A RECONFIGURABLE CIRCUIT CONFIGURATION IN ACCORDANCE WITH STORED CONFIGURATION DATA AND A MEMORY STORING FIXED VALUE DATA TO BE SUPPLIED TO THE ARITHMETIC UNIT, REQUIRING NO DATA AREA FOR STORING FIXED VALUE DATA TO BE SET IN A CONFIGURATION MEMORY

(75) Inventors: Tetsuo Kawano, Kawasaki (JP); Hiroshi Furukawa, Kawasaki (JP); Ichiro Kasama, Kawasaki (JP); Kazuaki Imafuku, Kawasaki (JP); Toshiaki Suzuki, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 808 days.

(21) Appl. No.: 11/035,055

(22) Filed: Jan. 14, 2005

(65) Prior Publication Data

US 2006/0004991 A1 Jan. 5, 2006

(30) Foreign Application Priority Data

Jun. 30, 2004 (JP) ............................. 2004-194104

(51) Int. Cl.
*G06F 7/38* (2006.01)
(52) U.S. Cl. ..................................................... 708/230
(58) Field of Classification Search .......... 708/230–236
See application file for complete search history.

(56) References Cited

U.S. PATENT DOCUMENTS 4,748,585 A * 5/1988 Chiarulli et al. ............... 712/15

| 5,301,344 | A | 4/1994 | Kolchinsky |
| 6,226,735 | B1 * | 5/2001 | Mirsky ........................ 712/18 |
| 6,353,841 | B1 * | 3/2002 | Marshall et al. ............. 708/232 |
| 2004/0054869 | A1 | 3/2004 | Igarashi |
| 2005/0021578 | A1 * | 1/2005 | Chen et al. .................. 708/230 |

FOREIGN PATENT DOCUMENTS

JP 6-131155 5/1994

(Continued)

OTHER PUBLICATIONS

Rafael Maestre et al., "A Framework for Reconfigurable Computing: Task Scheduling and Context Management", IEEE Transactions on Very Large Scale Integration (VLSI) Systems, vol. 9, No. 6, Dec. 2001, pp. 858-873.

(Continued)

*Primary Examiner*—Tan V Mai
(74) *Attorney, Agent, or Firm*—Staas & Halsey LLP (57) ABSTRACT

A semiconductor device includes a configuration memory for storing configuration data, an arithmetic unit whose circuit configuration can be reconfigured in accordance with the configuration data, and a fixed value memory for storing fixed value data to be supplied to the arithmetic unit. Since the configuration data and fixed value data to be supplied to the arithmetic unit are stored in the different memories, no data area for storing the fixed value data need be set in the configuration memory. This makes it possible to supply a predetermined fixed value to the arithmetic unit by storing only information for reading out fixed value data from the fixed value memory.

10 Claims, 7 Drawing Sheets

FOREIGN PATENT DOCUMENTS

WO          03/009125          1/2003

OTHER PUBLICATIONS

Chinese Patent Office Action, mailed Jan. 26, 2007, and issued in corresponding Chinese Patent Application No. 200510002822.4.

Patent Abstracts of Japan, Japanese Patent Publication No. 6-309223, Publication Date: Nov. 4, 1994. abstract only.

Office Action mailed on Nov. 18, 2008 and issued in corresponding Japanese Patent Application No. 2004-194104.

* cited by examiner

| CD1 | CD2 | CD3 | | CDN | | CVAD | |
|---|---|---|---|---|---|---|---|
| ---- | ---- | ---- | | ---- | | 000 | ←FUNC1 |
| | | | | | | 000 | ←FUNC2 |
| | | | | | | 000 | ←FUNC3 |
| | | | | | | 001 | ←FUNC4 |
| | | | | | | 010 | ←FUNC5 |
| | | | | | | 010 | ←FUNC6 |
| | | | | | | 011 | ←FUNC7 |
| | | | | | | 001 | ←FUNC8 |
| ⋮ | ⋮ | ⋮ | ⋮ | ⋮ | ⋮ | ⋮ | |
| | | | | | | | ←FUNC128 |

FIG. 4B

| CVAD | CVD1 | CVD2 | CVD3 | | CVDN |
|---|---|---|---|---|---|
| 000 | 0 | 0 | C1 | | 0 |
| 001 | 0 | 0 | 0 | | 0 |
| 010 | 0 | B1 | C1 | | D1 |
| 011 | 0 | B2 | C1 | | D2 |

| CD1 | CD2 | CD3 | | CDN | | CVAD1 | CVAD2 | |
|---|---|---|---|---|---|---|---|---|
| ---- | ---- | ---- | | ---- | | 0 | 00 | ←FUNC1 |
| | | | | | | 0 | 00 | ←FUNC2 |
| | | | | | | 0 | 00 | ←FUNC3 |
| | | | | | | 1 | 00 | ←FUNC4 |
| | | | | | | 0 | 01 | ←FUNC5 |
| | | | | | | 0 | 01 | ←FUNC6 |
| | | | | | | 0 | 10 | ←FUNC7 |
| | | | | | | 1 | 00 | ←FUNC8 |
| ⋮ | ⋮ | ⋮ | ⋮ | ⋮ | ⋮ | ⋮ | ⋮ | |
| | | | | | | | | ←FUNC128 |

F I G. 6B

| CVAD1 | CVD1 | CVD3 |
|---|---|---|
| 0 | 0 | C1 |
| 1 | 0 | 0 |

F I G. 6C

| CVAD2 | CVD2 | CVDN |
|---|---|---|
| 00 | 0 | 0 |
| 01 | B1 | D1 |
| 10 | B2 | D2 |

FIG. 7

SEMICONDUCTOR DEVICE HAVING AN ARITHMETIC UNIT OF A RECONFIGURABLE CIRCUIT CONFIGURATION IN ACCORDANCE WITH STORED CONFIGURATION DATA AND A MEMORY STORING FIXED VALUE DATA TO BE SUPPLIED TO THE ARITHMETIC UNIT, REQUIRING NO DATA AREA FOR STORING FIXED VALUE DATA TO BE SET IN A CONFIGURATION MEMORY

CROSS-REFERENCE TO RELATED APPLICATIONS

This application is based upon and claims the benefit of priority from the prior Japanese Patent Application No. 2004-194104, filed on Jun. 30, 2004, the entire contents of which are incorporated herein by reference.

BACKGROUND OF THE INVENTION

1. Field of the Invention

The present invention relates to a semiconductor device and, more particularly, to a semiconductor device having a dynamically reconfigurable circuit configuration.

2. Description of the Related Art

A conventional semiconductor device such as an LSI is generally fabricated to be able to execute predetermined processing meeting required specifications, by determining, in a designing step, the arrangement of AND gates, OR gates, and the like and their interconnections so as to execute the predetermined processing. That is, to realize a desired function in a conventional semiconductor device, this semiconductor device realizing the function is fabricated by designing the circuit configuration (logic configuration) for each gate (on each gate level).

Unfortunately, the circuit configuration of the above semiconductor device is fixed in the designing step. Therefore, to execute processing meeting different required specifications by changing specifications and the like, design and fabrication must be entirely performed each time. This requires much labor and time, and the development cost is also high.

One method solving this problem is a reconfigurable semiconductor device called a reconfigurable LSI capable of changing processing to be executed by reconfiguring the logic even after fabrication. This reconfigurable semiconductor device has a plurality of arithmetic units each receiving a control signal (configuration information) from a CPU, and capable of changing its function. This arithmetic unit is formed by appropriately combining a shifter, ALU (Arithmetic and Logic Unit), selector, and the like, and can change processing to be executed by receiving the configuration information from the CPU, and reconfiguring the logic accordingly.

Also, as address control concerning memories, a technique which holds a memory address in a memory (register) is disclosed (e.g., Patent Document 1).

[Patent Document 1]
Japanese Patent Application Laid-open No. Hei 6-309223.

SUMMARY OF THE INVENTION

It is an object of the present invention to reduce the storage capacity required to store fixed value data in a semiconductor device having a reconfigurable circuit configuration.

A semiconductor device of the present invention comprises an arithmetic unit group having a plurality of arithmetic units and having a circuit configuration reconfigurable in accordance with configuration information, a configuration memory, and a fixed value memory. The configuration memory stores the configuration information to be supplied to the arithmetic unit group. The fixed value memory stores fixed values to be supplied to the arithmetic unit group and used in arithmetic processing.

In the present invention, the configuration information and fixed values to be supplied to the arithmetic unit group are stored in the memories controllable independently of each other. Therefore, information for reading out a desired fixed value from the fixed value memory need only be stored in the configuration memory without forming any fixed value data area in it. In addition, the fixed value memory need not store a fixed value for each state of an arithmetic processor, i.e., for each configuration information.

DETAILED DESCRIPTION OF THE PREFERRED EMBODIMENTS

In the aforementioned conventional reconfigurable semiconductor device, the processing speed is low because the CPU directly controls a plurality of arithmetic units. For example, when processing to be executed by a plurality of arithmetic units is to be changed on the basis of an interrupt from a certain arithmetic unit, the CPU calls and executes an interrupt processing routine in response to the interrupt from the arithmetic unit, and then supplies configuration information corresponding to the processing result of the processing routine or the like to the arithmetic units. This interrupt processing requires a time equivalent to a few tens of clock-cycles. In the conventional reconfigurable semiconductor device, therefore, the processing speed is low, so processing to be executed by the arithmetic units cannot be dynamically changed (for each clock).

Figure 1:
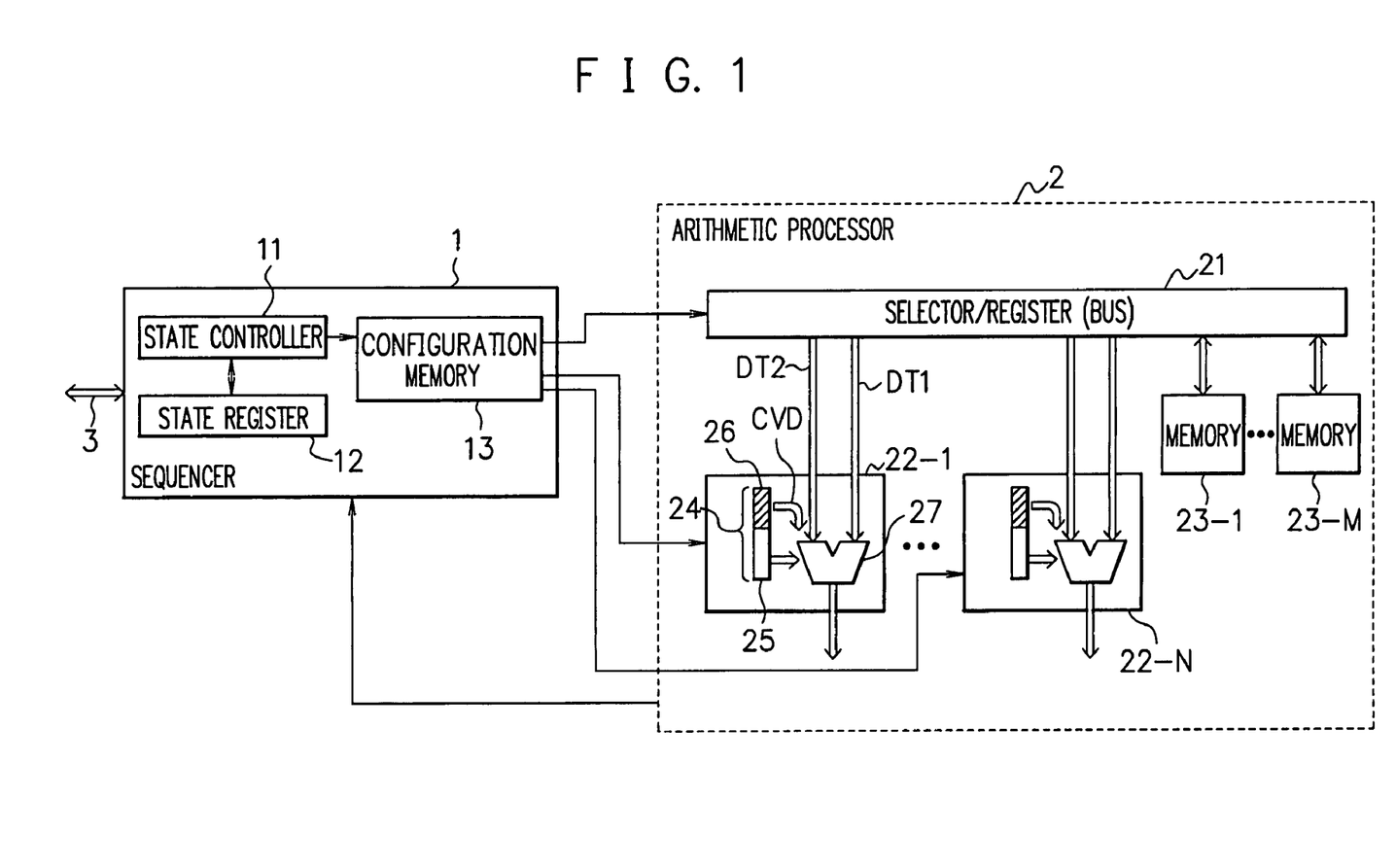
FIG. 1 is a view showing an example of the arrangement of a reconfigurable semiconductor device.

As one method of solving this problem, the present applicant has proposed a reconfigurable semiconductor device having an arrangement as shown in FIG. 1.

FIG. 1 is a view showing an example of the arrangement of the reconfigurable semiconductor device proposed by the present applicant. Instead of a CPU, this semiconductor device has a sequencer having functions equivalent to a CPU in order to perform circuit configuration (logic configuration) change control.

As shown in FIG. 1, the reconfigurable semiconductor device has a sequencer (controller) 1 and arithmetic processor 2.

The sequencer 1 comprehensively controls the semiconductor device in accordance with instructions from the outside (e.g., a processor connected via an external bus 3). The sequencer 1 manages and controls to dynamically change the circuit configuration (including logic configuration) of the arithmetic processor 2. To dynamically change the circuit configuration of the arithmetic processor 2 in accordance with an application, the sequencer 1 is connected to individual functional units of the arithmetic processor 2 via signal lines so as to be able to supply control signals, including configuration data (configuration information), from the sequencer 1.

The sequencer 1 has a state controller 11, state register 12, and configuration memory 13.

On the basis of, e.g., a preset sequence or a state transition indication signal from the arithmetic processor 2, the state controller 11 generates a configuration memory address for reading out, from the configuration memory 13, configuration data and fixed value data which change the state (circuit configuration) of the arithmetic processor 2 to the next state, and also generates the read timing. The generation of the configuration memory address by the state controller 11 is done by referring to information indicative of the present state held in the state register 12. When the present state changes to the next state, the information held in the state register 12 is updated.

The configuration memory 13 stores configuration data which sets the circuit configuration of the arithmetic processor 2, and fixed value data. All the configuration data and fixed value data are externally prewritten in the configuration memory 13 before an operation is started, and held as a pair of data for each state. The configuration data and fixed value data stored in the configuration memory 13 are read out and output to the arithmetic processor 2 under the control of the state controller 11. The contents of the configuration memory 13 will be described in detail later.

The arithmetic processor 2 has a selector/register (bus) 21, arithmetic units 22-i, and data memories 23-j. Note that i and j are suffixes, i is a natural number from 1 to N (arbitrary), and j is a natural number from 1 to M (arbitrary).

The selector/register 21 is controlled by the configuration data supplied from the sequencer 1. The selector/register 21 is connected to arithmetic units 22-1 to 22-N and data memories 23-1 to 23-M, and exchanges data with the arithmetic unit 22-i and data memory 23-M. In other words, the selector/register 21 has a network function of connecting the arithmetic units 22-1 to 22-N and data memories 23-1 to 23-N so that they can communicate with each other.

More specifically, in accordance with the configuration data, the selector/register 21 supplies data to the arithmetic unit 22-i, supplies write data to the data memory 23-j, and receives the supply of readout data from the data memory 23-j. Also, the selector/register 21 has a register which temporarily holds, e.g., an output (arithmetic result) from the arithmetic unit 22-i, and can selectively output data held in the register or data supplied from another place in accordance with the configuration data.

Each arithmetic unit 22-i has a register 24 and ALU unit 27.

The register 24 includes a configuration register 25 and fixed value register 26 for holding the configuration data and fixed value data, respectively, supplied from the sequencer 1.

The ALU unit 27 is formed by using, e.g., a shift circuit (shifter), ALU (Arithmetic and Logic Unit), and selector (for the sake of descriptive convenience, these components will also be simply referred to as arithmetic units hereinafter without distinguishing between them). Note that the ALU unit 27, more specifically, a plurality of arithmetic units (or one arithmetic unit) forming the ALU unit 27 can be appropriately selected and determined in accordance with an application to be used.

In each ALU unit 27, the operation mode of each arithmetic unit and the connections between the arithmetic units are set on the basis of the configuration data held in the configuration register 25. That is, the circuit configuration of each ALU unit 27 can be changed in accordance with the configuration data, and the individual arithmetic units are so controlled as to realize desired functions such as addition, multiplication, bit operations, and logic operations (AND, OR, and EOR).

In a shift circuit, for example, a shift amount, an arithmetic shifting process, a logic shifting process, a masking process of a predetermined bit after-the shifting process, and the like are controlled. Also, in an ALU formed by using, e.g., an AND (logic product operation) circuit and OR (logic sum operation) circuit, the circuit (arithmetic) function of the ALU as a whole is controlled by appropriately combining these circuits. In a selector, for example, one of a plurality of inputs, which is to be output, is controlled. Furthermore, the connections between the shift circuit, ALU, selector, and the like are controlled.

The ALU unit 27 receives first input data DT1 supplied from the selector/register 21, and also receives second input data DT2 supplied from the selector/register 21 in accordance with the configuration data, or fixed value data CVD held in the fixed value register 26. The ALU unit 27 performs a predetermined operation by using these data, and outputs the operation result. Although this output from the ALU unit 27 can be directly output, it may also be fed back on the basis of the configuration data. For example, outputs can be accumulated, standardized, and then output.

Each data memory 23-j stores data pertaining to processing in the arithmetic processor 2.

Figure 2:
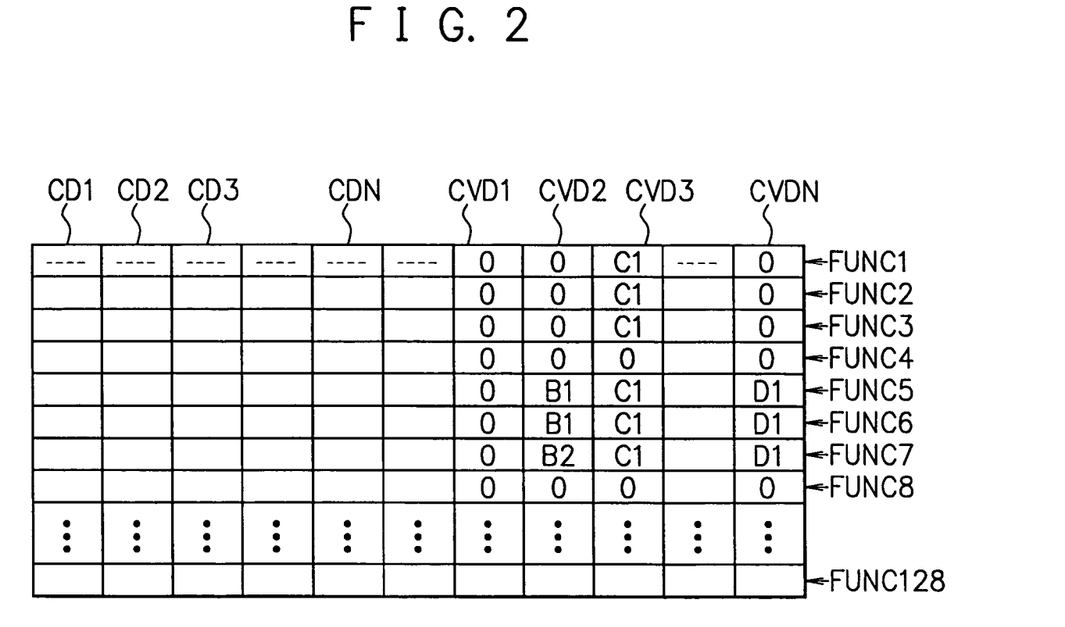
FIG. 2 is a view for explaining the contents of a configuration memory shown in FIG. 1.

FIG. 2 is a view for explaining the contents of the configuration memory 13 shown in FIG. 1. As shown in FIG. 2, the configuration memory 13 stores the configuration data and fixed value data corresponding to each state. In FIG. 2, reference symbol CDi denotes the configuration data; and CVDi, the fixed value data. Note that i is a suffix and is a natural number from 1 to N (arbitrary). Referring to FIG. 2, only the values of the fixed value data CVDi are shown, and the values of the configuration data CDi are omitted.

When the kth (k is a suffix and is a natural number from 1 to 128) state is to be set, the configuration data CDi and fixed value data CVDi are supplied to the arithmetic unit 22-i and held in the configuration register 24. That is, configuration data and fixed value data pertaining to a certain circuit configuration FUNCk for realizing a desired circuit function in the arithmetic processor 2 are made up of a pair of configuration data CD1 to CDN and fixed value data CVD1 to CVDN arranged in the row direction shown in FIG. 2. Note that although not shown in FIG. 2, the configuration memory 13 of course stores, e.g., configuration data for controlling the selector/register 21, in addition to the configuration data related to the arithmetic unit 22-i.

By using the sequencer 1 instead of a CPU as described above, the reconfigurable semiconductor device makes so-called dynamic reconfiguration possible, so the circuit configuration (logic) can be dynamically reconfigured for each clock. For example, the arithmetic processor 2 can perform function A during a certain clock period and perform function B different from function A during the next clock period on the basis of the configuration data (control signal) from the sequencer 1.

In the reconfigurable semiconductor device shown in FIGS. 1 and 2, however, for the arithmetic unit capable of receiving a fixed value (constant), fixed value data is saved together with configuration data in the configuration memory 13, and, where necessary, read out to and held in the configuration register 24 corresponding to the arithmetic unit. To save fixed value data in the configuration memory 13 as described above, it is necessary to form a fixed value data area for storing fixed value data in each arithmetic unit capable of receiving fixed value data, and save all fixed value data in the configuration memory 13. If the width of the second input data from the selector/register 21 to the arithmetic unit capable of receiving fixed value data is 32 bits, 32-bit fixed value data areas must be formed in the configuration memory 13 for each arithmetic unit and for all states (to be also referred to as "configurations" hereinafter) of the arithmetic processor 2.

It is, however, almost unnecessary to set fixed value data as an input to each arithmetic unit for all the states of the arithmetic processor 2, i.e., to set fixed value data as an input to each arithmetic unit whenever the states of the arithmetic processor 2 are switched. Accordingly, the fixed value data area formed as described above wastes the storage area of the configuration memory 13, so a large memory (storage area) is consumed when fixed value data is to be saved in the configuration memory 13.

An embodiment of the present invention will be described below with reference to the accompanying drawings.

Figure 3:
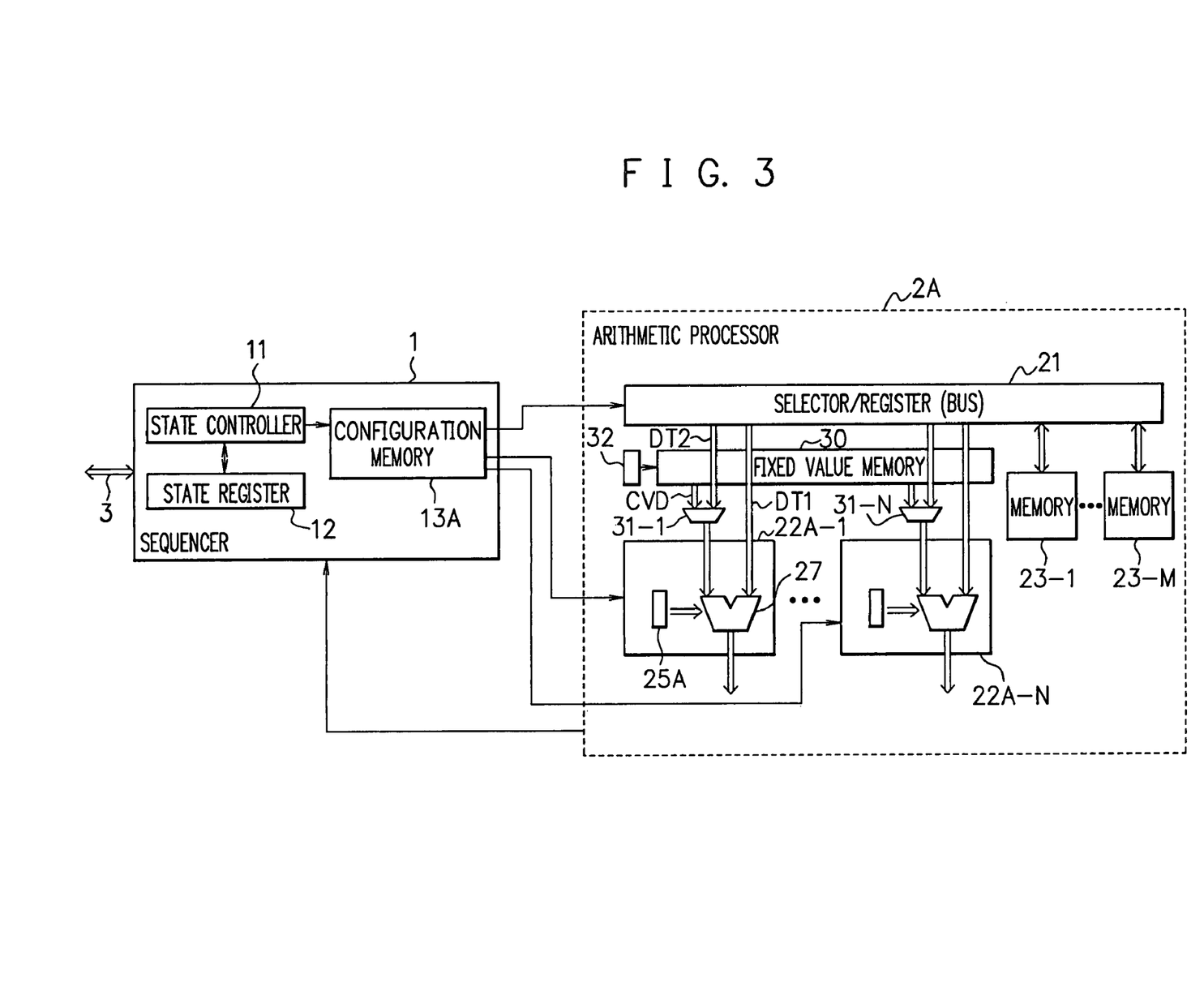
FIG. 3 is a view showing an example of the arrangement of a reconfigurable semiconductor device according to an embodiment of the present invention.

FIG. 3 is a view showing an example of the arrangement of a reconfigurable semiconductor device according to the embodiment of the present invention. The same reference numerals as in FIG. 1 denote constituent elements having the same functions in FIG. 3, and a repetitive explanation thereof will be omitted.

As shown in FIG. 3, the reconfigurable semiconductor device according to this embodiment has a sequencer (controller) 1 and arithmetic processor 2A. The arithmetic processor 2A contains a fixed value memory (RAM) 30 for storing fixed value data.

The sequencer 1 has a state controller 11, state register 12, and configuration memory 13A.

The configuration memory 13A stores configuration data for setting the circuit configuration of the arithmetic processor 2A, and fixed value designation data. The fixed value designation data is information by which fixed value data in the fixed value memory 30, which corresponds to the state of the arithmetic processor 2A can be uniquely identified. The fixed value designation data is used to designate and read out fixed value data corresponding to the state of the arithmetic processor 2A, from fixed value data stored in the fixed value memory 30. Note that in the following explanation, the fixed value designation data is an address in the fixed value memory 30.

The arithmetic processor 2A has a selector/register (bus) 21, arithmetic units 22A-i, data memories 23-j, fixed value memories 30, selectors 31-i, and a fixed value designation register 32. Note that i and j are suffixes, i is a natural number from 1 to N (arbitrary), and j is a natural number from 1 to M (natural number).

The fixed value memory 30 is a memory for storing fixed value data. The fixed value data stored in the fixed value memory 30 is read out and output to the selector 31-i on the basis of an address value set in the fixed value designation register 32 by the sequencer 1.

The selector 31-i is controlled by configuration data supplied from the sequencer 1, and selectively outputs second input data DT2 supplied from the selector/register 21 or fixed value data CVD supplied from the fixed value memory 30 to an ALU unit 27 in the arithmetic unit 22A-i. More specifically, when the selector 31-i is so set as to output fixed value data by the configuration data, it outputs the fixed value data CVD supplied from the fixed value memory 30 via a terminal, allocated to the arithmetic unit 22A-i, in the fixed value memory 30. When the selector 31-i is so set as to output the second input data DT2 by the configuration data, it outputs the second input data DT2 supplied from the selector/register 21.

Each arithmetic unit 22A-i has a configuration register 25A and the ALU unit 27. In this embodiment, fixed value data is read out from the fixed value memory 30 to the ALU unit 27 via the selector 31-i. Therefore, in each arithmetic unit 22A-i, the configuration register 25A is the only register, so the fixed value register shown in FIG. 1 is not used.

Note that the configuration data and fixed value designation data stored in the configuration memory 13A and the fixed value data stored in the fixed value memory 30 are externally prewritten and held, before an operation is started, in the configuration memory 13A and fixed value memory 30, respectively, by, e.g., a RISC (processor) or another hardware. Note also that the configuration data and fixed value designation data are held as a pair of data in the configuration memory 13A for each state.

Figure 4A:
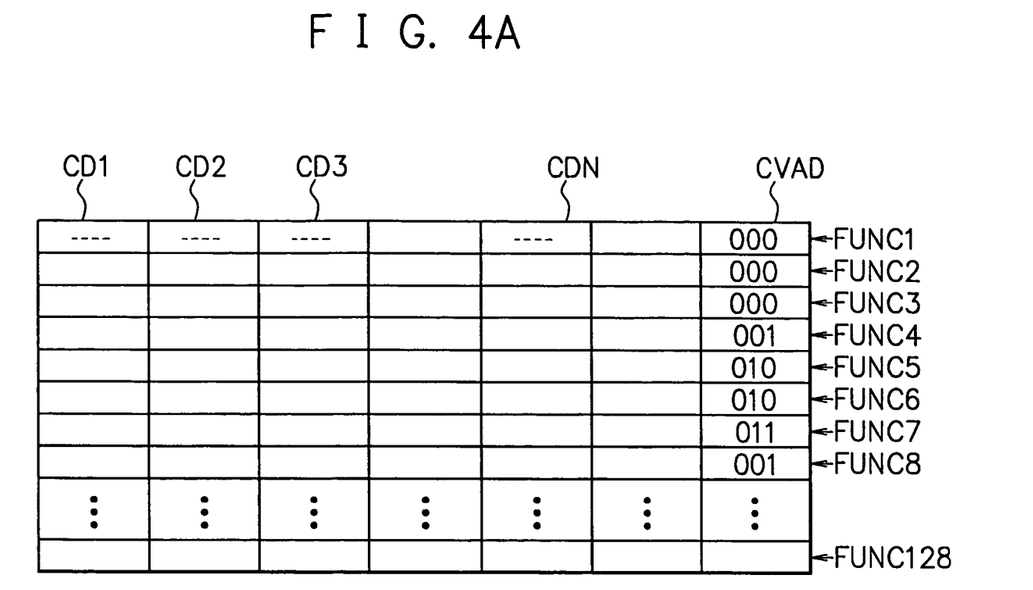
FIGS. 4A and 4B are views for explaining the contents of a configuration memory and fixed value memory shown in FIG. 3.
Figure 4B:
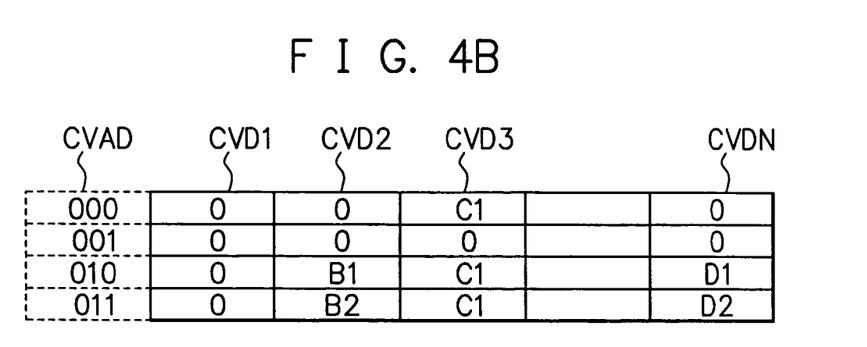

FIGS. 4A and 4B are views for explaining the contents of the configuration memory 13A and fixed value memory 30 shown in FIG. 3. For the purpose of comparison, FIGS. 4A and 4B illustrate contents equivalent to the contents of the configuration memory 13 shown in FIG. 2.

FIG. 4A shows the contents of the configuration memory 13A. In FIG. 4A, reference symbol $CDi$ (i=1 to N (natural number)) denotes the configuration data; and CVAD, an address value as the fixed value designation data in the fixed value memory 30.

FIG. 4B shows the contents of the fixed value memory 30. In FIG. 4B, reference symbol CVAD denotes an address value in the fixed value memory 30; and $CVDi$ (i=1 to N (natural number)), the fixed value data.

As shown in FIG. 4B, the same combinations of the fixed value data $CVDi$ are not individually stored but stored as one set of fixed value data $CVDi$ in the fixed value memory 30. That is, the combinations of the fixed value data $CVDi$ stored in the fixed value memory 30 are different from each other, and are not duplicated.

Also, as shown in FIG. 4A, the configuration memory 13A stores only the configuration data $CDi$, and the address value CVAD in the fixed value memory 30, in which the combination of the fixed value data $CVDi$ corresponding to this state is stored.

The operation of the reconfigurable semiconductor device according to this embodiment will be explained below. Note that the operation is the same as the reconfigurable semiconductor device shown in FIGS. 1 and 2 except for an operation of inputting fixed value data to the arithmetic unit in the arithmetic unit 22A-i, so an explanation of the rest of the operation will be omitted.

The operation when fixed value data is input to the arithmetic unit in the arithmetic unit 22A-i will be described below.

First, to switch the state of the arithmetic processor 2, configuration data and fixed value designation data corresponding to this state are read out from the configuration memory 13A. The readout configuration data is supplied to the functional units in the arithmetic processor 2A including the selector 31-i. The readout fixed value designation data is supplied to and set in the fixed value designation register 32.

On the basis of the fixed value designation data set in the fixed value designation register 32, fixed value data stored in an area designated by this fixed value designation data is read out from the fixed value memory 30, and output to the arithmetic unit 22A-i via the selector 31-i. In this manner, the fixed value data is supplied to the arithmetic unit in the arithmetic unit 22A-i.

This embodiment described above uses one fixed value memory 30. However, as shown in FIG. 5, a plurality of fixed value memories may also be used.

Figure 5:
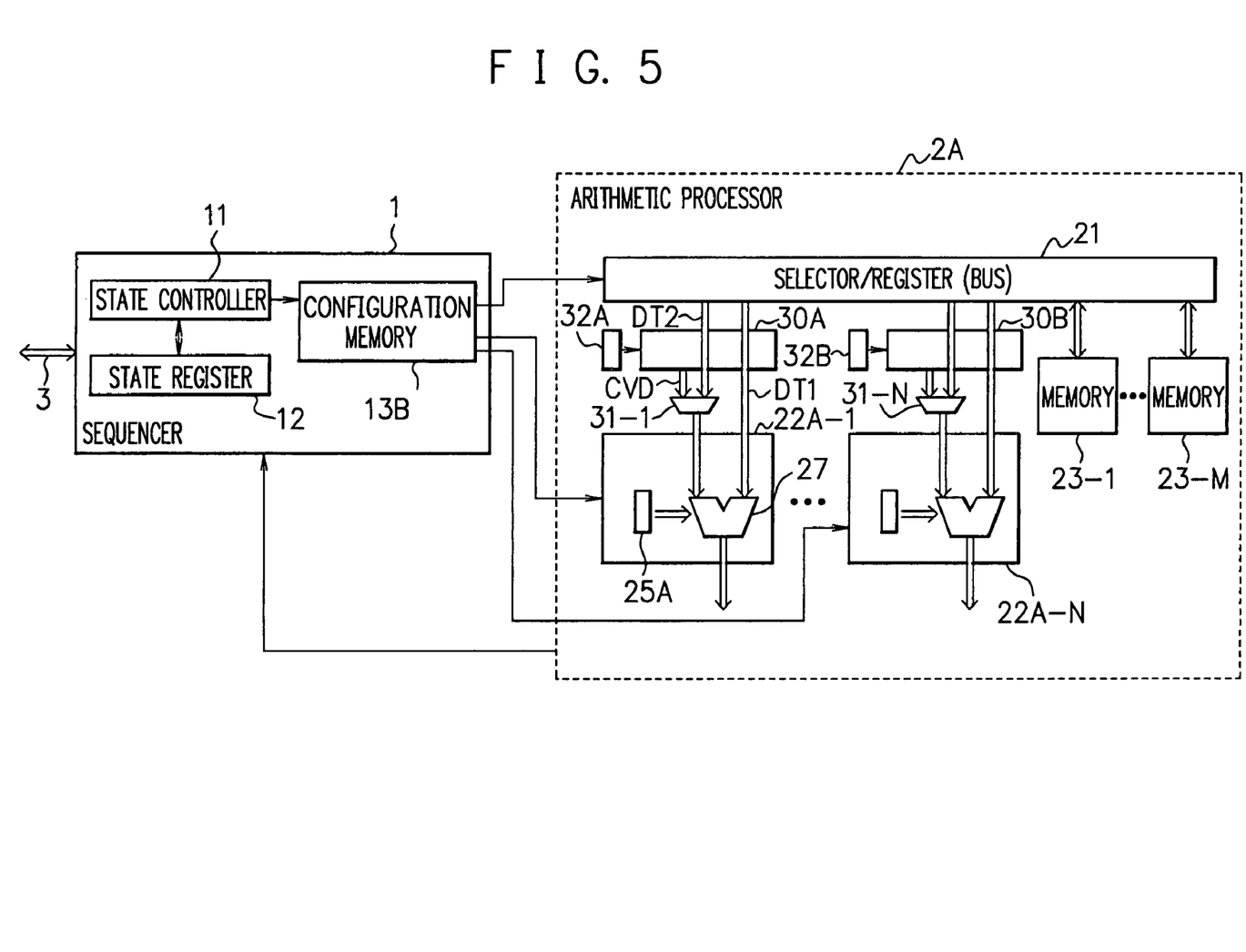
FIG. 5 is a view showing another example of the arrangement of the reconfigurable semiconductor device according to the embodiment of the present invention.

FIG. 5 is a view showing another example of the arrangement of the reconfigurable semiconductor device according to this embodiment. The same reference numerals as in FIGS. 1 and 3 denote constituent elements having the same functions in FIG. 5, and a repetitive explanation thereof will be omitted.

A reconfigurable semiconductor device shown in FIG. 5 has a sequencer (controller) 1 and arithmetic processor 2A. The arithmetic processor 2A contains two fixed value memories (RAMs) 30A and 30B.

The sequencer 1 has a state controller 11, state register 12, and configuration memory 13B. The configuration memory 13B stores configuration data, and two fixed value designation data corresponding to the fixed value memories 30A and 30B.

The arithmetic processor 2A differs from that shown in FIG. 3 in that it has the two fixed value memories 30A and 30B, and two fixed value designation registers 32A and 32B corresponding to the fixed value memories 30A and 30B. However, the fixed value memories 30A and 30B, and the fixed value designation registers 32A and 32B are the same functions as the fixed value memory 30 and fixed value designation register 32 shown in FIG. 3, respectively, so a detailed explanation thereof will be omitted.

Figure 6A:
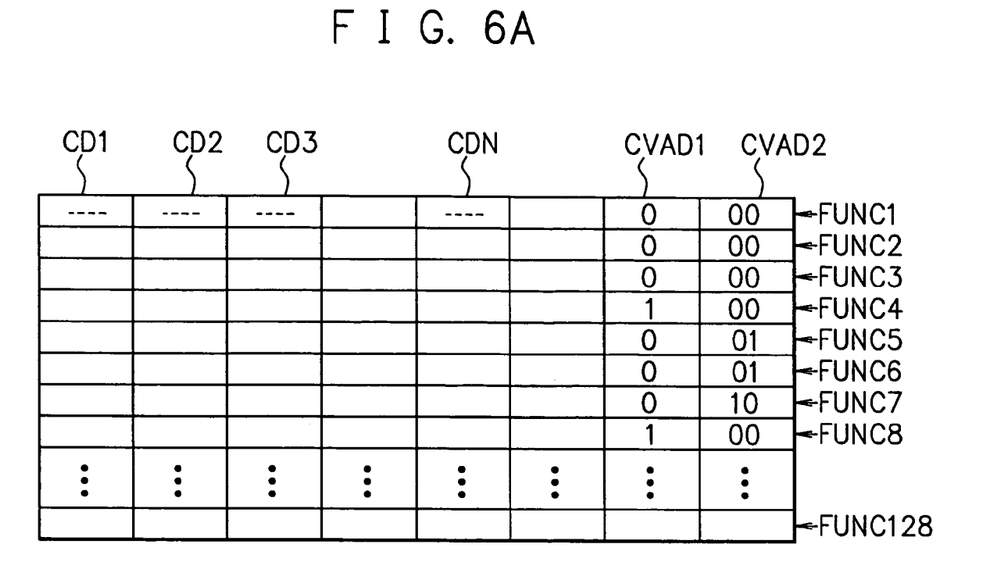
FIGS. 6A to 6C are views for explaining the contents of a configuration memory and fixed value memory shown in FIG. 5.
Figure 6B:
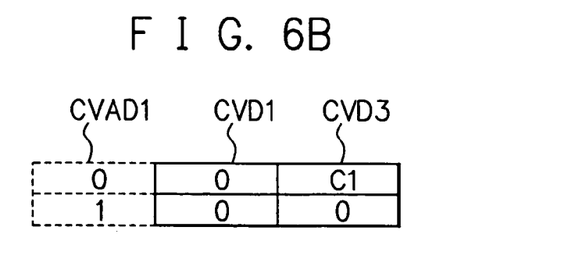
Figure 6C:
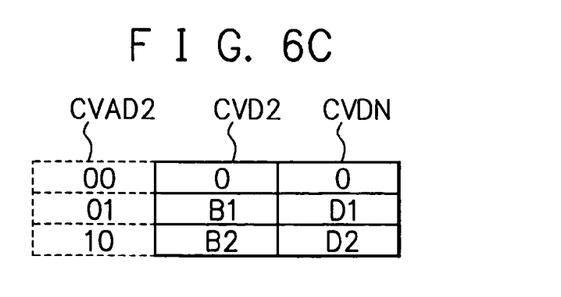
Figure 7:
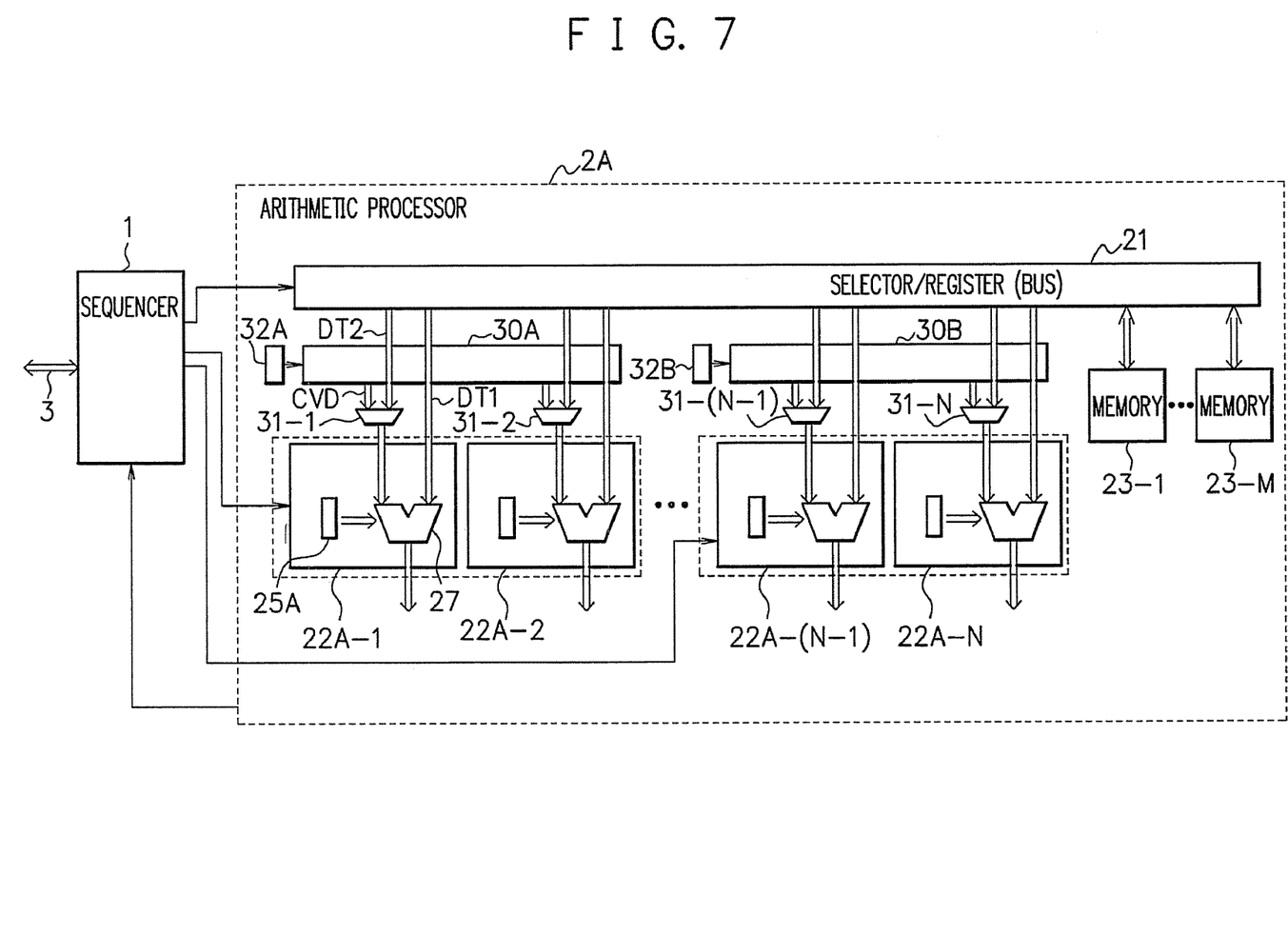
FIG. 7 is a view showing another example of the arrangement of the reconfigurable semiconductor device according to the embodiment of the present invention.

FIGS. 6A to 6C are views for explaining the contents of the configuration memory 13B and fixed value memories 30A and 30B shown in FIG. 5. For the purpose of comparison, FIGS. 6A to 6C illustrate contents equivalent to the contents shown in FIGS. 4A and 4B.

FIG. 6A shows the contents of the configuration memory 13B. In FIG. 6A, reference symbol CDi (i=1 to N (natural number)) denotes the configuration data; and CVAD1 and CVAD2, address values in the fixed value memories 30A and 30B, respectively.

FIGS. 6B and 6C show the contents of the fixed value memories 30A and 30B, respectively. In FIGS. 6B and 6C, reference symbols CVAD1 and CVAD2 denote address values in the fixed value memories 30A and 30B, respectively; and CVDi (i=1 to N (natural number)), fixed value data. Note that FIGS. 6B and 6C illustrate a case in which fixed value data CVD1 and CVD3 are stored in the fixed value memory 30A, and fixed value data CVD2 and CVDN are stored in the fixed value memory 30B.

Similar to the case shown in FIG. 4B, the same combinations of the fixed value data CVDi are stored as one pair of fixed value data CVDi in each of the fixed value memories 30A and 30B.

Also, as shown in FIG. 6A, the configuration memory 13B stores the configuration data CDi, and the address values CVAD1 and CVAD2 in the fixed value memories 30A and 30B, respectively, in which the combinations of the fixed value data CVDi corresponding to the state of the configuration data are stored.

In FIGS. 5 and 6A to 6C, the case in which the two fixed value memories 30A and 30B are used is shown as an example. However, the number of the fixed value memories is any arbitrary number. Also, the correspondence between the fixed value memories and arithmetic units is any arbitrary correspondence, provided that no specific arithmetic unit always corresponds to a plurality of fixed value memories. For example, one arithmetic unit can correspond to one fixed value memory, or each of a plurality of groups obtained by dividing an arithmetic unit can correspond to one fixed value memory.

Also, the arrangement shown in FIGS. 5 and 6A to 6C is not necessarily an optimum arrangement. Therefore, the arrangement shown in FIGS. 3, 4A, and 4B or the arrangement shown in FIGS. 5 and 6A to 6C can be appropriately selected in accordance with an application used.

In this embodiment as described above, fixed value data is stored in the fixed value memory 30 (30A and 30B), and configuration data and an address value of a fixed value memory, which is used to read out fixed value data corresponding to the state of the configuration data, are stored in the configuration memory 13A (13B). In the fixed value memory 30 (30A and 30B), only different combinations of fixed value data are stored in order to avoid duplication.

Accordingly, the configuration memory need only store address values of the fixed value memory without storing any fixed value data. This makes it possible to reduce the required storage capacity of the configuration memory, and decrease the chip size. For example, to save eight different combinations of fixed value data in the fixed value memory, the address value can be expressed by three bits. As a consequence, the storage area can be very efficiently used.

In addition, the fixed value memory does not store fixed value data for each state, but stores the same combinations of fixed value data as a pair of fixed value data. This greatly reduces the data amount. Also, fixed value data is stored in the fixed value memory, and this fixed value data can be supplied to the ALU unit 27 via the selector 31-i. This makes it possible to omit a fixed value register, and reduce the circuit scale.

Note that in the above embodiment, only one configuration register 25 is shown as an example. However, configuration registers are usually formed in one-to-one correspondence with arithmetic units. It is also possible to form one configuration register 25 for a plurality of arithmetic units, since fixed value data is not supplied via any register.

Note also that the arrangement of the reconfigurable semiconductor device according to this embodiment shown in the accompanying drawings is merely an example. Therefore, the reconfigurable semiconductor device may also include a shift register, a counter circuit, and memories such as a RAM and ROM.

The above embodiments are merely practical examples when the present invention is practiced, so the technical scope of the present invention should not be limitedly interpreted by these embodiments. That is, the present invention can be practiced in various forms without departing from the technical idea or principal features of the invention.

In the present invention, the fixed value memory different from the configuration memory for storing the configuration information stores fixed values to be supplied to the arithmetic unit group. Since no data area for storing fixed values need be set in the configuration memory, a predetermined fixed value can be supplied to the arithmetic unit group only by storing, in the configuration memory, information for reading out the fixed value from the fixed value memory. Accordingly, the required storage capacity of the configuration memory can be reduced, so the configuration memory can be formed by a small-sized memory.

Also, since fixed values are stored in the fixed value memory different from the configuration memory, no fixed value need be stored for each state of the arithmetic processor, and fixed value registers can be omitted. Consequently, it is possible to reduce the storage capacity required to store fixed values, and decrease the circuit scale.

What is claimed is:

1. A semiconductor device comprising:
   a configuration memory storing configuration information;
   an arithmetic unit group having a plurality of arithmetic units, and capable of reconfiguring a circuit configuration in accordance with the configuration information supplied from said configuration memory; and
   a fixed value memory storing a fixed value to be used in arithmetic processing in said arithmetic unit group, and supplying the stored fixed value to said arithmetic unit group, wherein:
   said configuration memory stores, together with the configuration information, fixed value designation information to acquire a fixed value, corresponding to the configuration information, from said fixed value memory.

2. The device according to claim 1, further comprising:
   a fixed value designation information register holding the fixed value designation information read out together with the configuration information from said configuration memory, and supplying the fixed value designation information to said fixed value memory.

3. The device according to claim 1, wherein the fixed value designation information is address information of said fixed value memory, which indicates an area in which a fixed value corresponding to the configuration information is stored.

4. The device according to claim 1, further comprising a selector selectively supplying, to said arithmetic unit group, a fixed value supplied from said fixed value memory or an input value different from the fixed value, in accordance with the configuration information.

5. The device according to claim 4, wherein said selector is placed between said arithmetic unit group and a bus connected to said arithmetic unit group, and selectively supplies, to said arithmetic unit group, a fixed value supplied from said fixed value memory or an input value from said bus.

6. The device according to claim 1, wherein the semiconductor device comprises a plurality of said arithmetic unit groups, and said fixed value memory is divided into an arbitrary number of memories in accordance with said plurality of arithmetic unit groups.

7. The device according to claim 1, wherein the semiconductor device comprises a plurality of said arithmetic unit groups and a plurality of said fixed value memories, and each of said plurality of arithmetic unit groups receives supply of a fixed value from one of said plurality of fixed value memories.

8. The device according to claim 7, wherein said configuration memory stores, together with the configuration information, fixed value designation information related to each fixed value memory and used to acquire, from said plurality of fixed value memories, a fixed value corresponding to the configuration information.

9. The device according to claim 1, wherein processing functions of said arithmetic units of said arithmetic unit group and an interconnection connecting said arithmetic units are changed in accordance with the configuration information.

10. The device according to claim 1, further comprising a sequencer controlling a change in circuit configuration of said arithmetic unit group, and managing a state of said arithmetic unit group.

* * * * *